(No Model.)
L. S. BARNDOLLAR.
THERMOMETER FOR OVENS.
No. 571,211.  Patented Nov. 10, 1896.
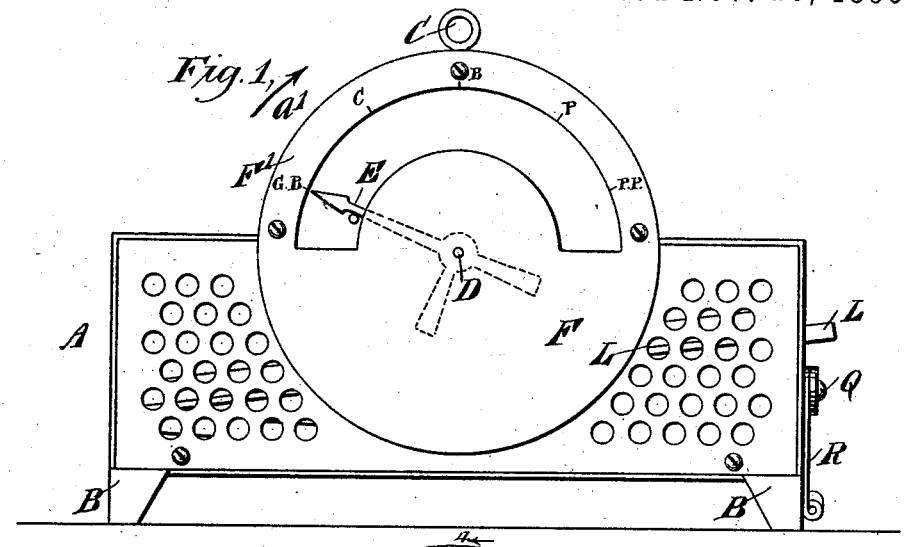
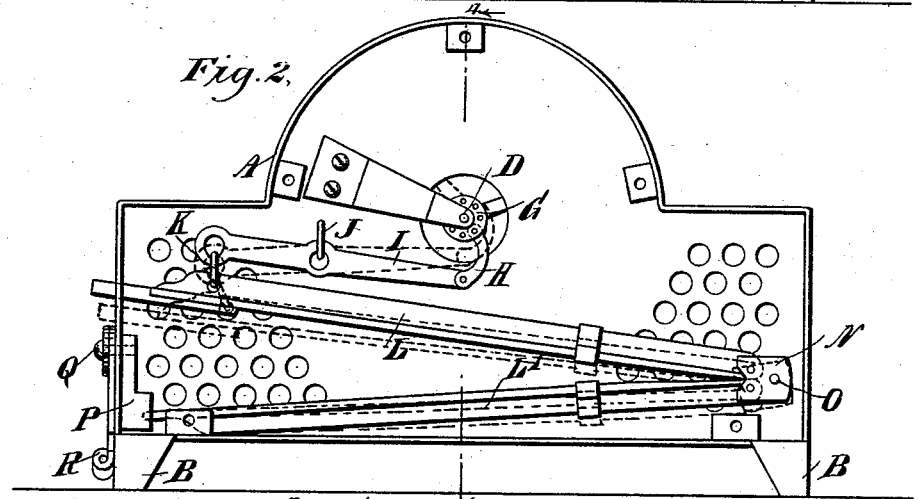
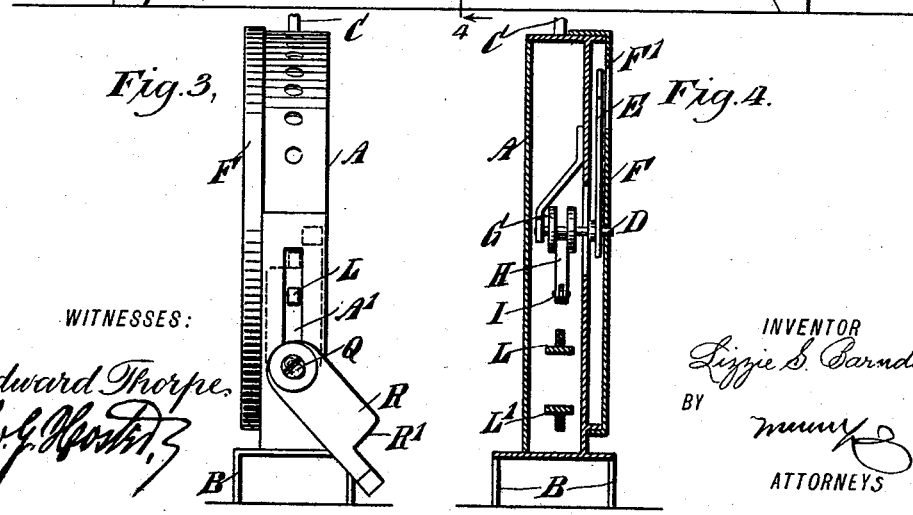
WITNESSES:
Edward Thorpe
Rev. G. Hoster
INVENTOR
Lizzie S. Barndollar
BY
ATTORNEYS

United States Patent Office.

LIZZIE S. BARNDOLLAR, OF TRINIDAD, COLORADO.

THERMOMETER FOR OVENS.

SPECIFICATION forming part of Letters Patent No. 571,211, dated November 10, 1896.

Application filed December 30, 1895. Serial No. 573,806. (No model.)

*To all whom it may concern:*

Be it known that I, LIZZIE S. BARNDOLLAR, of Trinidad, in the county of Las Animas and State of Colorado, have invented a new and Improved Thermometer, of which the following is a full, clear, and exact description.

The object of the invention is to provide a new and improved thermometer more especially designed for cooking-stoves and the like and arranged to indicate the heat of the stove, so as to enable the cook to regulate the fire according to the temperature required for properly cooking different food products.

The invention consists principally of a perforate casing, a pointer journaled in said casing and provided with a crank-disk, a lever fulcrumed in the casing and connected at one end with said crank-disk, and an expansion-bar connected with said lever.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a face view of the improvement. Fig. 2 is a rear face view of the same, with the back cover-plate removed. Fig. 3 is an end view of the improvement, and Fig. 4 is a cross-section of the same on the line 4 4 of Fig. 2.

The improved thermometer for ovens is provided with a suitably-constructed metallic casing A, formed in all its sides with perforations to permit the heat of the oven to conveniently circulate through said casing. The casing is provided with legs B for resting the device on the bottom or other part of the oven, the casing being preferably provided on the top with a ring C, adapted for conveniently moving the casing about.

In suitable bearings in the casing A is journaled a transversely-extending shaft D, on the front end of which is secured a pointer E, adapted to indicate on a graduation F', formed on an index-plate F, secured to the front of the casing, as plainly shown in Fig. 1. The graduation F' indicates the heat required for properly cooking different food products, the lowest temperature being about 250° Fahrenheit and the highest about 500° Fahrenheit, so that the travel of the pointer E is from 250° to 500° Fahrenheit.

Now in order to enable the cook to readily see the temperature required for different food products I prefer to indicate on the graduation the food products by their initials. For instance, as shown in Fig. 1, the graduation shows at 250° the initials "G. B.," standing for "ginger-bread," "C." indicating 300° and standing for "cake," "B." at 390° and standing for "bread," "P." at 400° and standing for "pie," and "P. P." at 460° and standing for "puff-paste."

On the shaft D within the casing is secured a crank-disk G, connected by a link H with one end of a lever I, fulcrumed at J in the casing and connected at its outer end by a link K with an expansion-bar L, formed of two strips of metal of unequal expansion—for instance, steel and copper. The end of the bar L, opposite where the link K is connected, is secured on a block N, fulcrumed on a pin O, secured in the casing, and on this block N is secured a second expansion-bar L', extending at an angle to the expansion-bar L and engaging with its remaining end a block P, adjustably held on one end of the casing A by means of a screw Q, passing through a vertically-disposed slot A' in this end of the casing, as plainly shown in Fig. 3.

A catch R is loosely fulcrumed on the screw Q and is provided with a shoulder R', adapted to pass under the free end of the expansion-bar L and lock the latter in an uppermost position whenever desired, it being understood that said free end of the expansion-bar L extends through the slot A', so as to be engaged by the catch R. The catch R holds the parts at rest when the device is not being used and prevents their needless exercise.

The operation is as follows: By adjusting the block P vertically the two expansion-bars L L' can be readily set to the desired degree of heat to cause the pointer E to move and indicate properly on the graduation F'. When it is desired to use the device, the casing is set in the oven to permit the heat to circulate through the casing and act on the compound expansion-bars L L' and impart a swinging motion to the lever I, so that the link H, acting on the crank-disk G, turns the shaft D to move the pointer E in the direction of the arrow $a'$. This operation is attained (see Fig. 2) by an action of the bar L', expanding longitudinally and rightward, causing the block N to swing downward and rightwardly advancing the bar L', which latter bar, also expanding, is longitudinally advanced to the right, and this combined action draws downward the left-hand arm of the lever I and swings the indicator, as explained. Now it will be seen that when it is desired to bake bread, for instance, the cook watches until the pointer E stands at "B." on the graduation F', that is, indicates that the heat of the oven is sufficient for properly baking the bread.

It will be understood that by having a compound expansion-bar, composed of two bars attached to a pivoted block, as shown and described, a very sensitive and reliable apparatus is obtained.

Having thus fully described my invention, I claim as new and desire to secure by Letters Patent—

1. A thermometer for ovens, the thermometer comprising a compound expansion-bar provided with two bars extending at an angle one to the other and secured each at one end to a pivoted block, a resistance-block for the remaining end of one of said bars, a lever connected with the remaining end of the other bar, a pointer adapted to be actuated from said lever, and a catch for locking one of the bars in place, substantially as shown and described.

2. In a thermometer, the combination with a casing, of an indicator mounted in the casing, two expansion-bars, one of which is connected with the indicator and the remaining one of which is engaged with a part rigid on the casing, and a pivotally-mounted block to which the expansion-bars are connected, substantially as described.

3. In a thermometer, the combination with a casing, of an indicator, two expansion-bars one of which is connected with the indicator and a pivotally-mounted connection between the two expansion-bars, said connection being capable of rocking downward under the influence of one bar to draw the second bar in the same direction, substantially as described.

4. In a thermometer, the combination with a casing, of an indicator, two expansion-bars, each bar consisting of two parts respectively formed of high and low expansive metal, one of said bars being connected with the indicator, and a pivotally-mounted connection between the two bars, substantially as described.

LIZZIE S. BARNDOLLAR.

Witnesses:
 THEO. G. HOSTER,
 JNO. M. RITTER.